United States Patent
Wu

(10) Patent No.: US 8,079,382 B2
(45) Date of Patent: Dec. 20, 2011

(54) UNFREEZE FAUCET STRUCTURE

(76) Inventor: Cheng-Hsuan Wu, Lugang Township, Changhua County (TW)

( * ) Notice: Subject to any disclaimer, the term of this patent is extended or adjusted under 35 U.S.C. 154(b) by 104 days.

(21) Appl. No.: 12/783,727

(22) Filed: May 20, 2010

(65) Prior Publication Data

US 2011/0114865 A1    May 19, 2011

Related U.S. Application Data

(63) Continuation-in-part of application No. 12/618,857, filed on Nov. 16, 2009.

(51) Int. Cl.
*F16K 25/00* (2006.01)

(52) U.S. Cl. ............ 137/454.5; 137/614.2; 137/625.31; 251/208; 251/333

(58) Field of Classification Search .......... 251/208, 251/333; 137/614.2, 625.31, 625.32, 454.6, 137/454.5, 454.2
See application file for complete search history.

(56) References Cited

U.S. PATENT DOCUMENTS

| | | | | |
|---|---|---|---|---|
| 2,088,685 A | * | 8/1937 | Birch | 137/505.11 |
| 2,366,144 A | * | 12/1944 | Griswold | 137/496 |
| 4,738,277 A | * | 4/1988 | Thomas | 137/454.5 |
| 5,392,805 A | * | 2/1995 | Chrysler | 137/218 |
| 5,996,614 A | * | 12/1999 | Ashton | 137/454.6 |
| 6,073,647 A | * | 6/2000 | Cook et al. | 137/315.12 |
| 6,142,172 A | * | 11/2000 | Shuler et al. | 137/360 |
| 6,880,573 B2 | * | 4/2005 | Berkman et al. | 137/614.2 |
| 6,929,029 B1 | * | 8/2005 | Chung | 137/614.2 |
| 7,140,390 B2 | * | 11/2006 | Berkman et al. | 137/614.2 |
| 2006/0157124 A1 | * | 7/2006 | Li et al. | 137/614.2 |
| 2006/0266418 A1 | * | 11/2006 | Klee | 137/360 |
| 2008/0083466 A1 | * | 4/2008 | Hsueh | 137/613 |

* cited by examiner

*Primary Examiner* — John Bastianelli

(74) *Attorney, Agent, or Firm* — Alan Kamrath; Kamrath IP Lawfirm, PA

(57) ABSTRACT

An unfreeze faucet structure includes a watering control valve having a body; a control shaft, an upper ceramic member, and a lower ceramic member connected with the body; a valve seat locked to the body; wherein the control shaft includes a watering cavity and a positioning groove mounted in a lower section thereof, the watering cavity includes a check element and a stopping unit installed therein, the check element includes a disk-shaped cover arranged on a bottom end thereof, the cover includes a first stop loop fitted to a peripheral side thereof, between the cover and the watering cavity is defined with a spring, the stopping unit includes a trench disposed therearound to contact with the first stop loop, the control shaft includes a second stop loop fitted on an outer periphery thereof and a third stop loop arranged therearound to engage with an inner wall of the watering cavity.

5 Claims, 10 Drawing Sheets

UNFREEZE FAUCET STRUCTURE

This application is a Continuation-in-Part of application Ser. No. 12/618,857, filed Nov. 16, 2009.

BACKGROUND OF THE INVENTION

1. Field of the Invention

The present invention relates to a faucet structure, and more particularly to an unfreeze faucet structure that can prevent from a freeze in a chilly weather.

2. Description of the Prior Art

As in FIGS. 7 and 8, a conventional unfreeze faucet includes a body 10 to control water flow and a check unit 20 to prevent water from flowing backward by using a spring 30, however, when the conventional unfreeze faucet is turned off, the water in the body 10 can not flow outward to be frozen in a chilly weather, hence the body 10 can not be used normally.

Referring to FIGS. 9 and 10, another conventional unfreeze faucet includes a watering control valve, the watering control valve includes a control shaft 50 inserted in a body 40, the control shaft 50 includes an upper ceramic member 60 and a lower ceramic member 70 mounted on a lower side thereof, the control shaft 50 includes a watering cavity 501 and a receiving room 502 to receive a spring 503, the watering cavity 501 includes a check element 504 and an O-ring 505 installed therein, the check element 504 includes a cover 5041 fixed on a bottom end thereof, the cover 5041 includes a guiding column 5042 extending upward from a central portion of a top surface thereof to be inserted into the receiving room 502 of the control shaft 50 to bias against the spring 503.

Nevertheless, when the watering control valve of the conventional unfreeze faucet is turned off to stop supplying water, the O-ring 505 is pushed upward by the upper ceramic member 60 at water pressure of a water pipe to deform, and the check element 504 is pushed upward by the upper ceramic member 60 to generate gaps between the upper ceramic member 60 and the lower ceramic member 70 and the check element 504 and the O-ring 505 respectively, and water in the water pipe leaks out of a fitting portion of the body 40 and the control shaft 50 from the gap between the upper ceramic member 60 and the lower ceramic member 70, or leak out of the gap between the check element 504 and the O-ring 505 from the gap between the upper ceramic member 60 and the lower ceramic member 70 via an orifice of the ceramic member 60. Besides, the spring 503 is installed in the receiving room 502 to limit its elastic coefficient, accordingly the check element 504 is not pushed well by the spring 503, and the spring 503 is locked to lose its elasticity.

The present invention has arisen to mitigate and/or obviate the afore-described disadvantages.

SUMMARY OF THE INVENTION

The primary object of the present invention is to provide an unfreeze faucet structure that the cover includes the first stop loop fitted to the peripheral side thereof to abut against the trench of the stopping unit, and the control shaft includes the second stop loop fitted on the outer periphery thereof below the holes to bias against the inner side of the body, the stopping unit includes the third stop loop arranged around the outer rim thereof to engage with the inner wall of the watering cavity of the control shaft, thus preventing water from leak as turning off the unfreeze faucet.

Another object of the present invention is to provide an unfreeze faucet structure that the check element is biased against by the spring defined between the cover and the watering cavity, therefore a diameter of the spring is not limited to obtain a suitable elastic coefficient to push the guiding column to engage with the stopping unit tightly, thus preventing the spring from being locked to lose its elasticity.

To obtain the above objectives, an unfreeze faucet structure provided by the present invention including a watering control valve comprising a body; a control shaft, an upper ceramic member, and a lower ceramic member which are connected with the body; a valve seat locked to a lower end of the body; wherein the body includes two opposite outlets disposed on a peripheral side of a middle section thereof, the control shaft is inserted to the body and its upper end extends out of the body, the upper ceramic member is received in the body and located at a lower side of the control shaft to engage with the control shaft, and includes two symmetrical bores formed on two sides thereof individually, the lower ceramic member contacts with the upper ceramic member and includes two symmetrical guide apertures disposed on two sides thereof respectively, includes two retaining projections mounted therearound to retain the lower ceramic member in the body, characterized in that:

the control shaft includes a watering cavity and a positioning groove mounted in a lower section thereof, the watering cavity includes a check element and a stopping unit installed therein, and the check element includes a disk-shaped cover arranged on a bottom end thereof, the cover includes a first stop loop fitted to a peripheral side thereof and a guiding column extending upward from a central portion of a top surface thereof to be inserted into the positioning groove, and between the cover and the watering cavity is defined with a spring to abut against the check element downward, the control shaft includes a second stop loop fitted on an outer periphery thereof below two holes of the control shaft to bias against an inner side of the body, the stopping unit includes a trench disposed around an inner wall of a peripheral washer to contact with the first stop loop of the check element, the control shaft includes a third stop loop arranged around an outer rim thereof to engage with an inner wall of the watering cavity of the control shaft.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
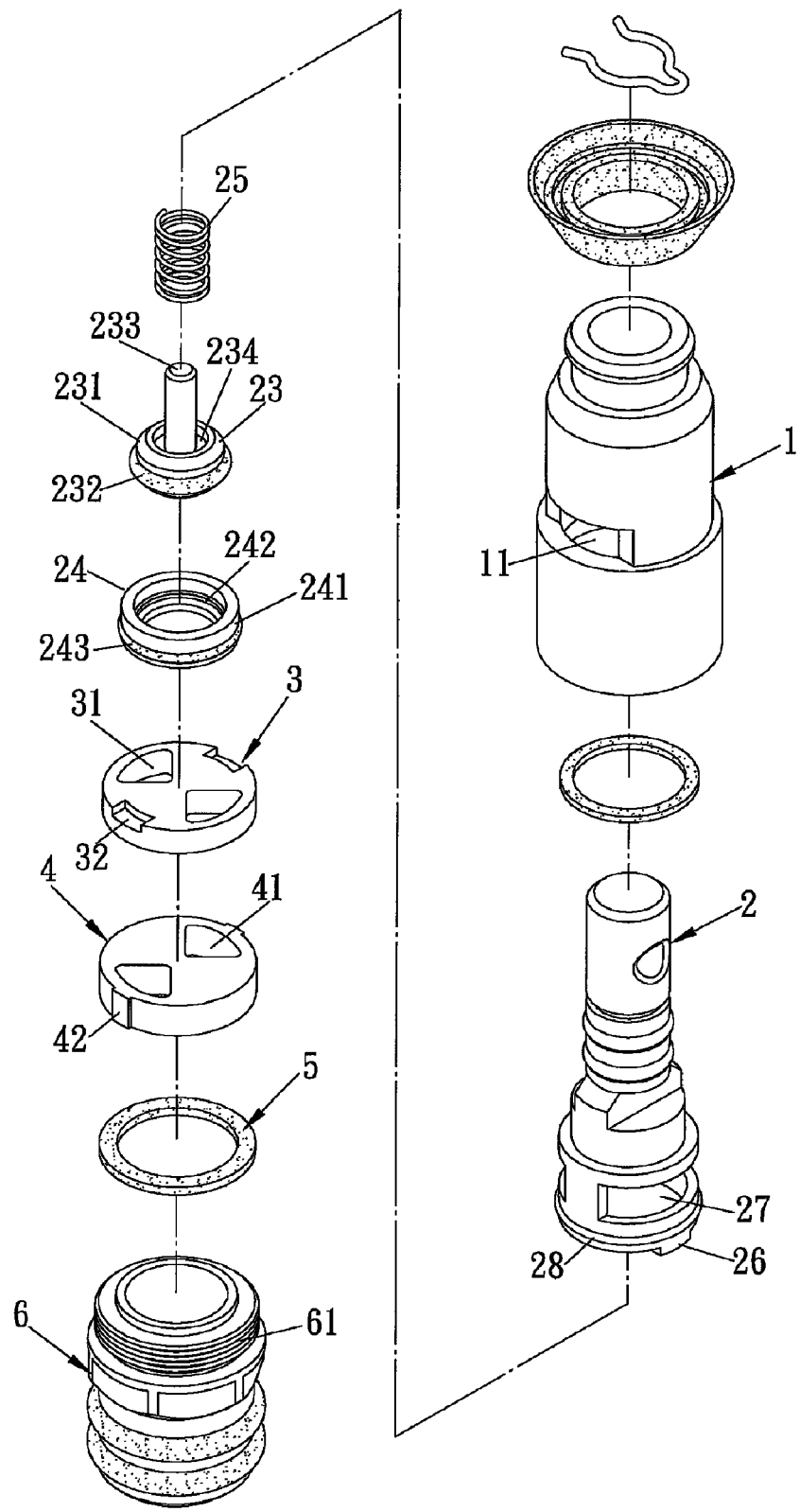
FIG. 1 is a perspective view showing the exploded components of a watering control valve of an unfreeze faucet structure according to a first embodiment of the present invention.
Figure 2:
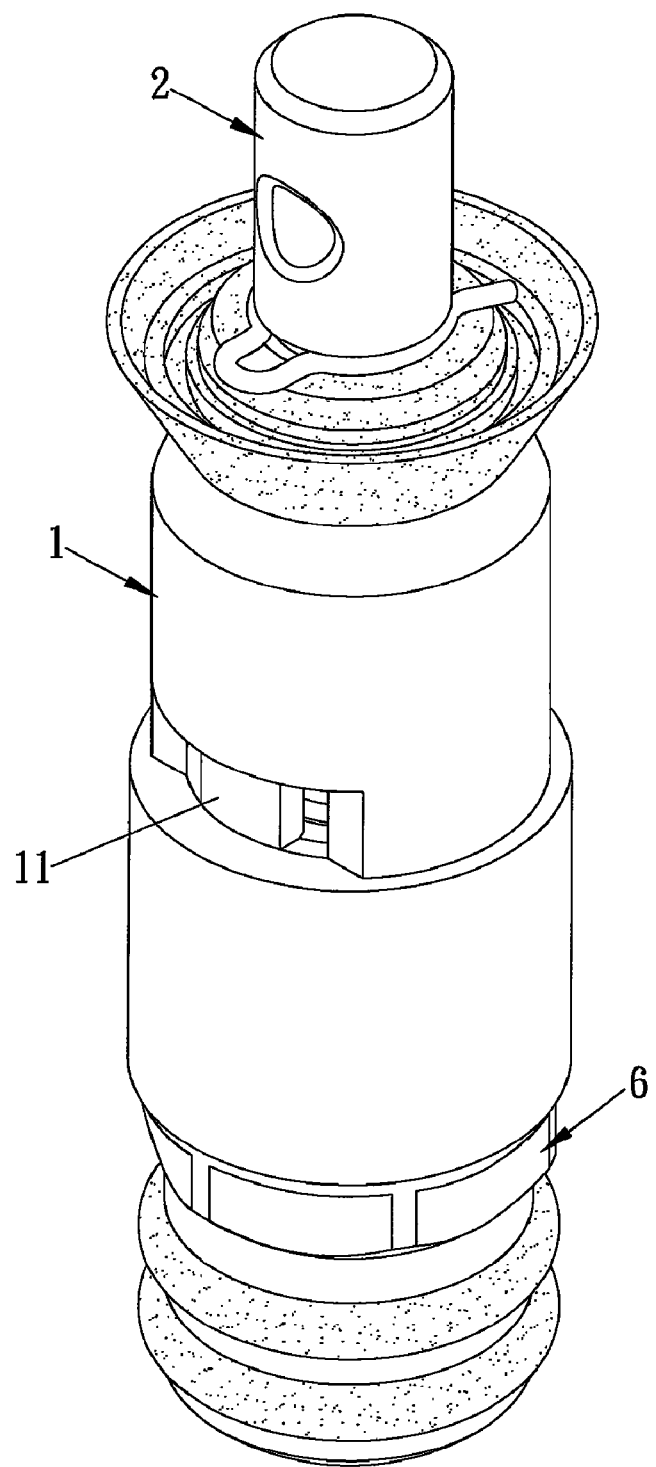
FIG. 2 is a perspective view showing the assembly of the watering control valve of the unfreeze faucet structure according to the first embodiment of the present invention.
Figure 3:
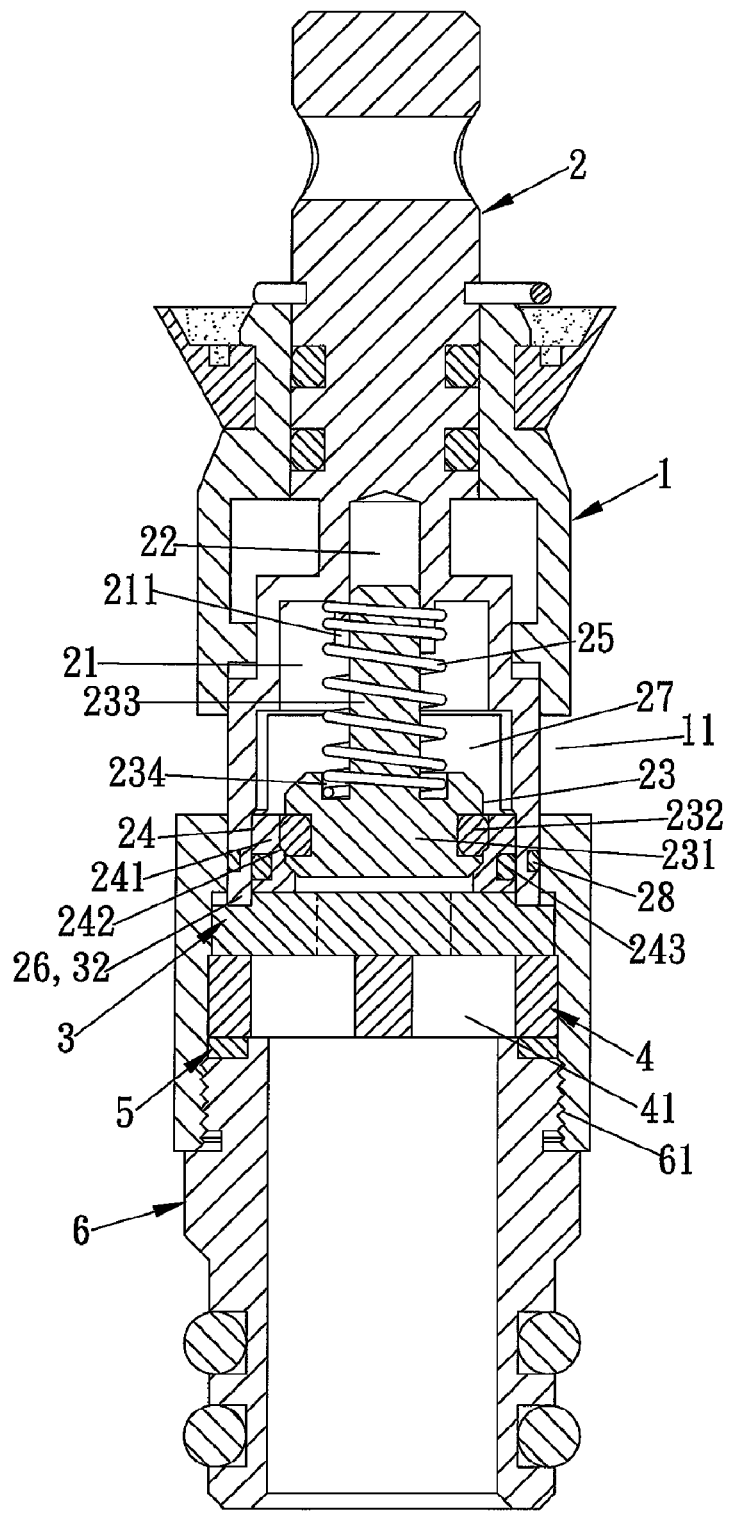
FIG. 3 is a cross sectional view showing the assembly of the watering control valve of the unfreeze faucet structure according to the first embodiment of the present invention.

With reference to FIGS. 1-3, a watering control valve of an unfreeze faucet structure in accordance with a first embodiment of the present invention includes a body 1; a control shaft 2, an upper ceramic member 3, and a lower ceramic member 4 which are connected with the body 1; a valve seat 6 locked to a lower end of the body 1 and having an O-ring 5 fitted on the valve seat 6; wherein the body 1 includes two opposite outlets 11 disposed on a peripheral side of a middle section thereof, the control shaft 2 is inserted to the body 1 and its upper end extends out of the body 1, and includes a watering cavity 21 mounted in a lower section thereof, the watering cavity 21 includes a positioning groove 22 extending upward from a central portion of a top surface thereof, and includes a hollow fitting post 211 fixed on the top surface thereof and extending downward from a peripheral side of the positioning groove 22, and includes a check element 23 and a stopping unit 24 installed therein, the check element 23 includes a disk-shaped cover 231 arranged on a bottom end thereof, and the cover 231 includes a first stop loop 232 fitted to a peripheral side thereof and a guiding column 233 extending upward from a central portion of a top surface thereof to be inserted into the positioning groove 22 of the control shaft 2 so as to move in the positioning groove 22, the cover 231 includes an annular slot 234 formed on a top surface thereof and around the guiding column 233, and between the annular slot 234 and the hollow fitting post 211 of the watering cavity 21 is defined with a spring 25 to abut against the check element 23 downward. The control shaft 2 also includes two opposite actuating pieces 26 extending outward from a bottom end thereof, two opposite holes 27 disposed around an outer rim of a lower side thereof, and a second stop loop 28 fitted on an outer periphery thereof below the holes 27 to bias against an inner side of the body 1. The stopping unit 24 is retained in the watering cavity 21, includes a peripheral washer 241 arranged around an outer rim thereof, includes a trench 242 disposed around an inner wall of the peripheral washer 241 to contact with the first stop loop 232 of the disk-shaped cover 231 of the check element 23, and includes a third stop loop 243 arranged around the outer rim thereof below the peripheral washer 241 to engage with an inner wall of the watering cavity 21 of the control shaft 2. The upper ceramic member 3 is received in the body 1 and located at a lower side of the control shaft 2 to abut against the stopping unit 24 upward, and includes two symmetrical bores 31 formed on two sides thereof individually and formed in a ¼ of a circle shape, includes two recesses 32 disposed thereon and each being defined between the two bores 31 to engage with the actuating pieces 26 of the control shaft 2. The lower ceramic member 4 is received in the body 1 to contact with the upper ceramic member 3, and includes two symmetrical guide apertures 41 disposed on two sides thereof respectively and formed in a ¼ of a circle shape, includes two retaining projections 42 mounted therearound to retain the lower ceramic member 4 in the body 1. The valve seat 6 includes an inlet end fixed on a bottom end thereof, includes the O-ring 5 fitted on a top surface thereof, includes a connecting portion 61 secured on an upper end thereof to connect with the lower end of the body 1 so that the O-ring 5 engages with the lower ceramic member 4 to stop water.

Figure 4:
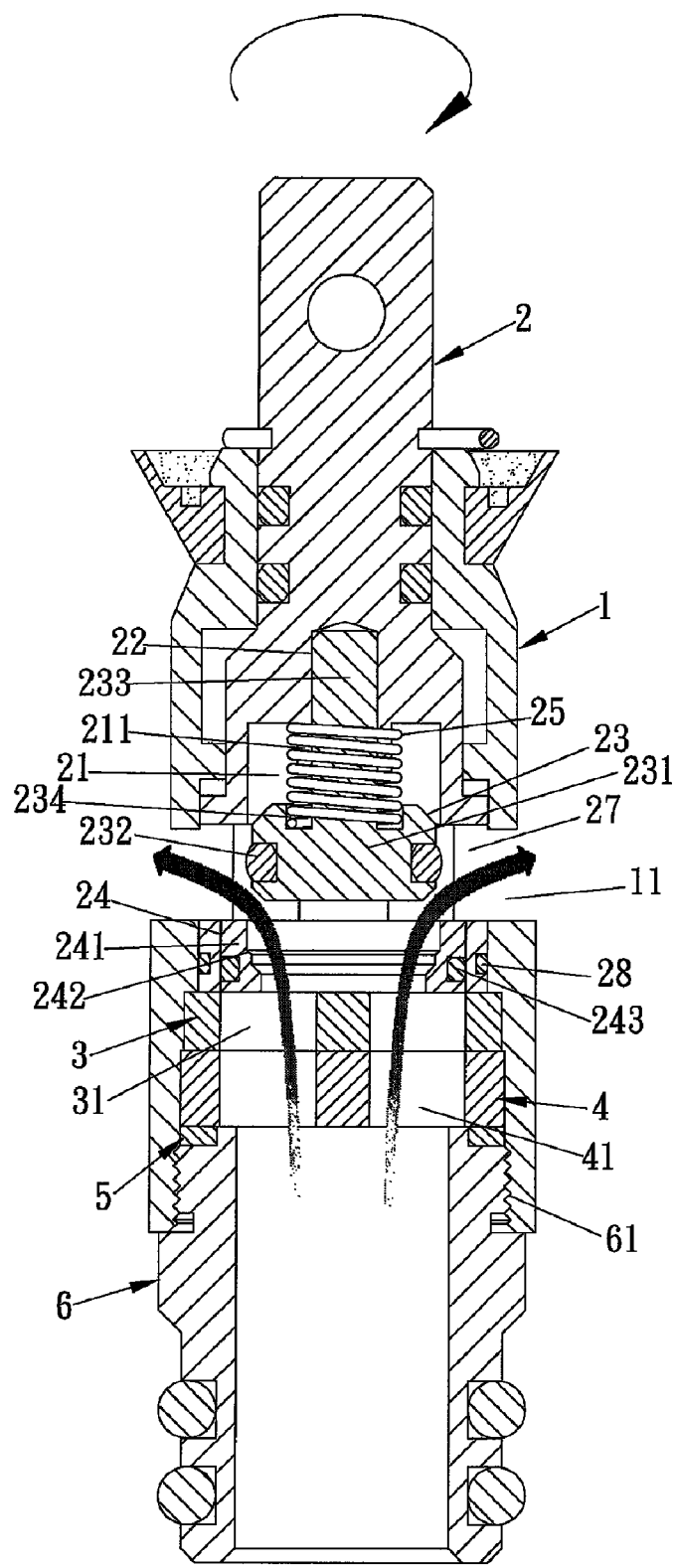
FIG. 4 is a cross sectional view showing a water flowing state of the watering control valve of the unfreeze faucet structure according to the first embodiment of the present invention.

When turning on the unfreeze faucet as shown in FIG. 4, a lever of the unfreeze faucet is rotated to drive the control shaft 2 to rotate, and then the upper ceramic member 3 is actuated by the actuating pieces 26 of the control shaft 2 to rotate simultaneously so that the bores 31 of the upper ceramic member 3 are aligned with the guide apertures 41 of the lower ceramic member 4, hence the water flows from the inlet end of the valve seat 6 to push the check element 23 of the control shaft 2 through the bores 31 of the upper ceramic member 3 and the guide apertures 41 of the lower ceramic member 4 so that the check element 23 moves upward along the positioning groove 22 of the control shaft 2 by using the guiding column 233, and the spring 25 and the cover 231 of the check element 23 disengage from the trench 242 of the stopping unit 24 so that the water flows from the watering cavity 21 toward the outlets 11 of the body 1 via the guide apertures 41 of the lower ceramic member 4, the bores 31 of the upper ceramic member 3, and the holes 27, thereby having water supply.

When the unfreeze faucet is tuned on to supply water, if a water pressure in a water pipe is lowered to a certain level or water can not be supplied from the unfreeze faucet, the check element 23 is pushed downward by the spring 25 so that the first stop loop 232 of the cover 231 abuts against the trench 242 of the stopping unit 24 to prevent water from flowing backward.

Figure 5:
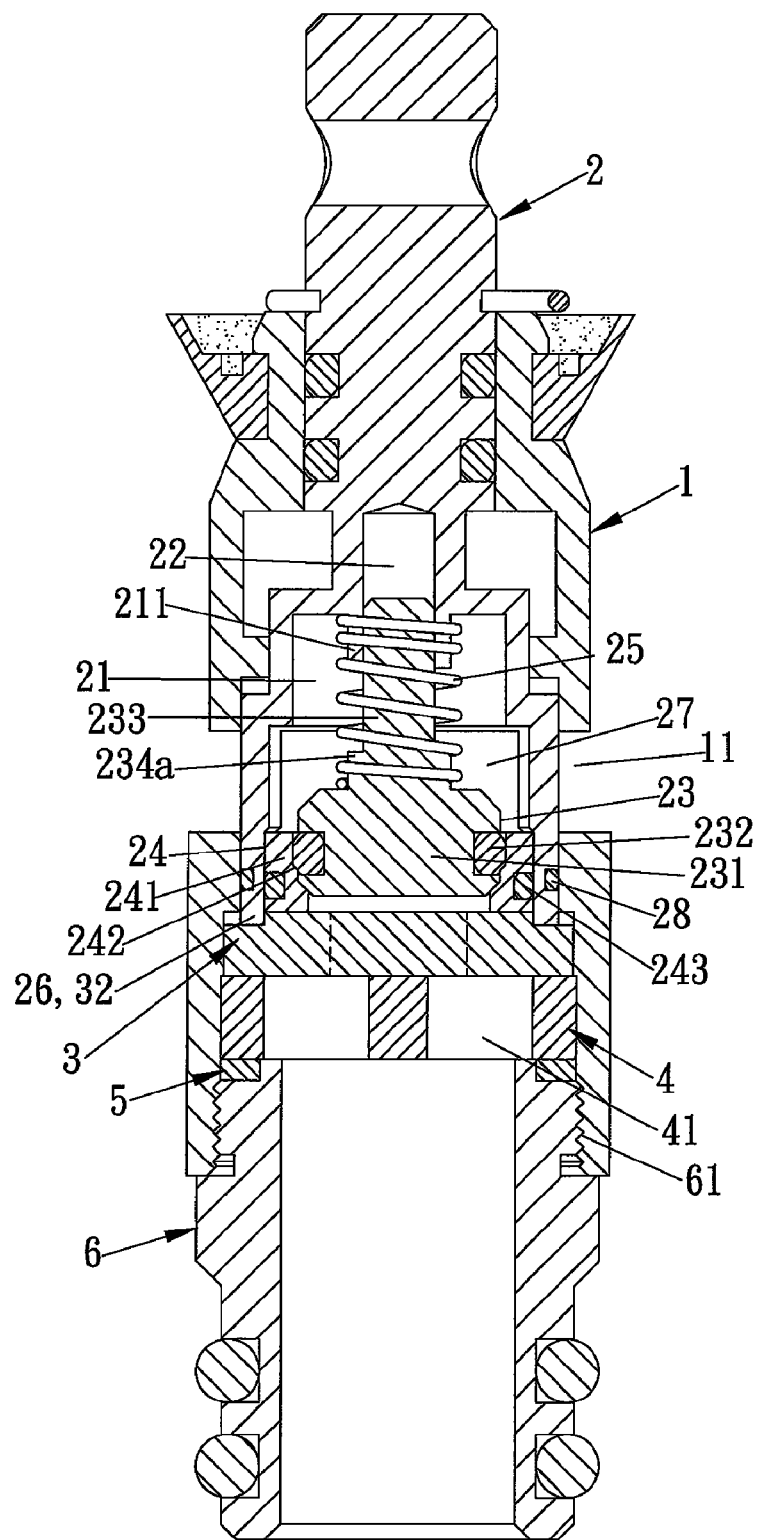
FIG. 5 is a cross sectional view showing the assembly of a watering control valve of an unfreeze faucet structure according to a second embodiment of the present invention.
Figure 6:
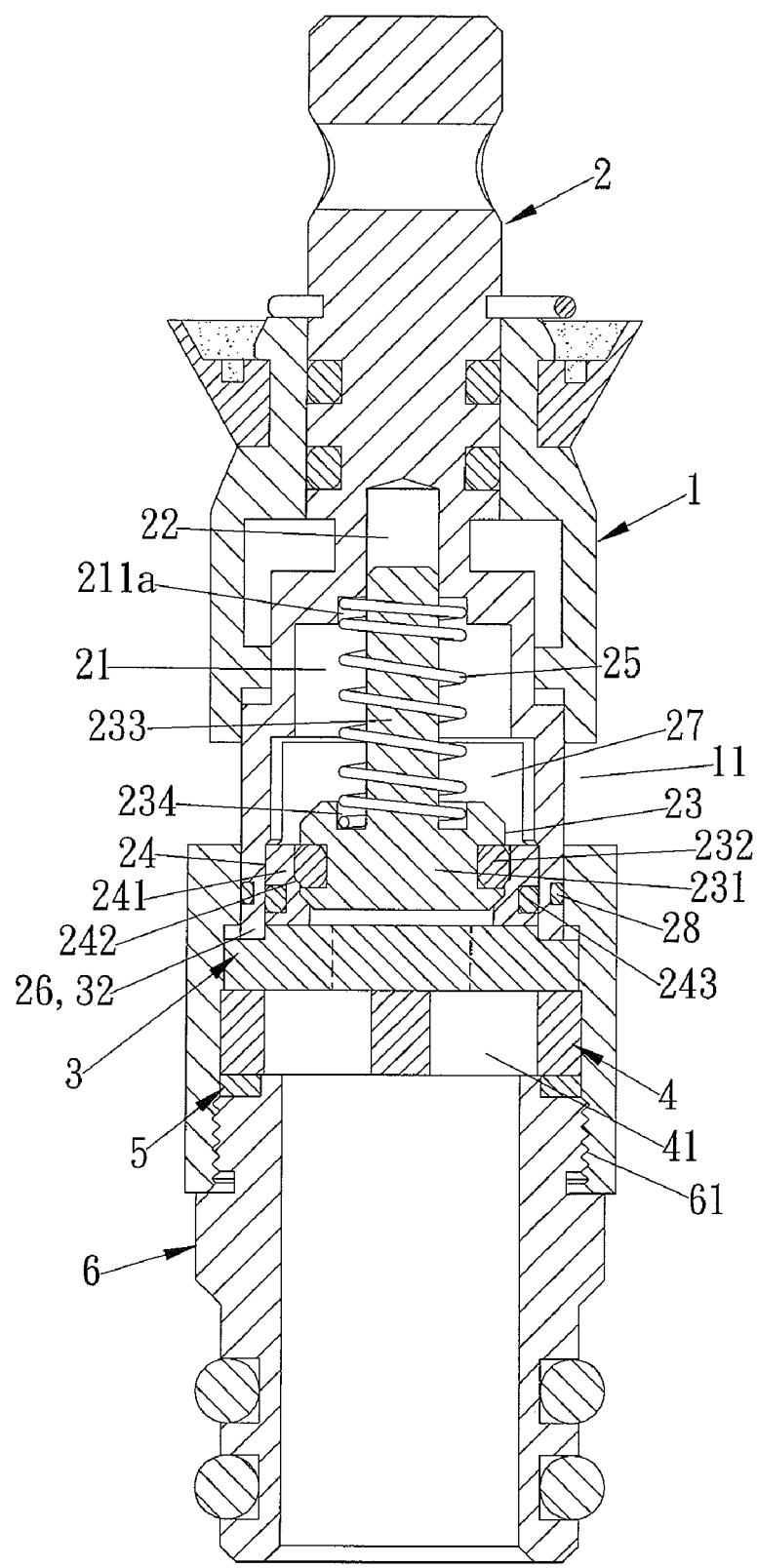
FIG. 6 is a cross sectional view showing the assembly of a watering control valve of an unfreeze faucet structure according to a third embodiment of the present invention.
Figure 7:
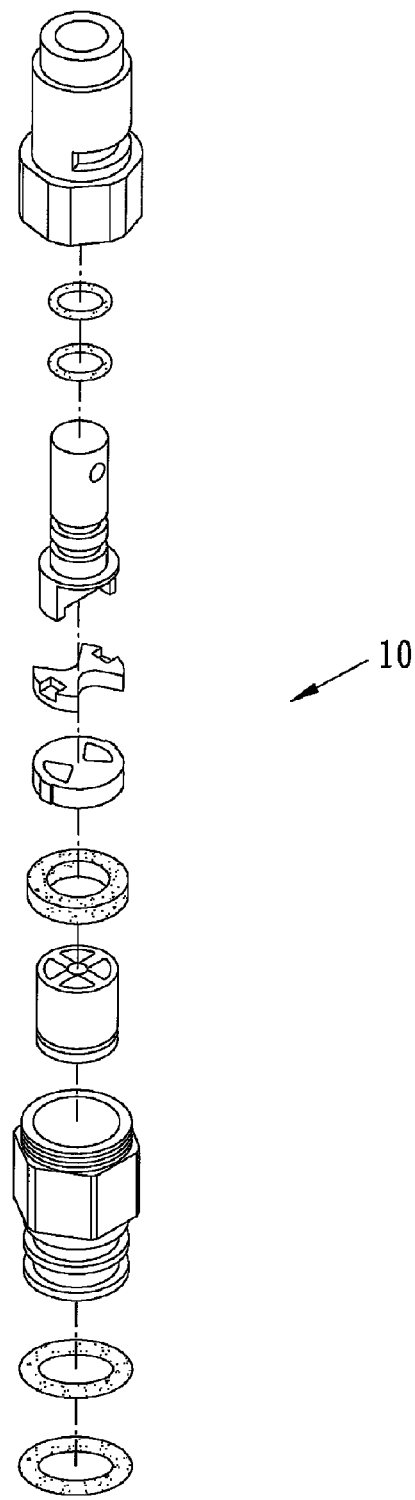
FIG. 7 is a perspective view showing the exploded components of a conventional watering control valve.
Figure 8:
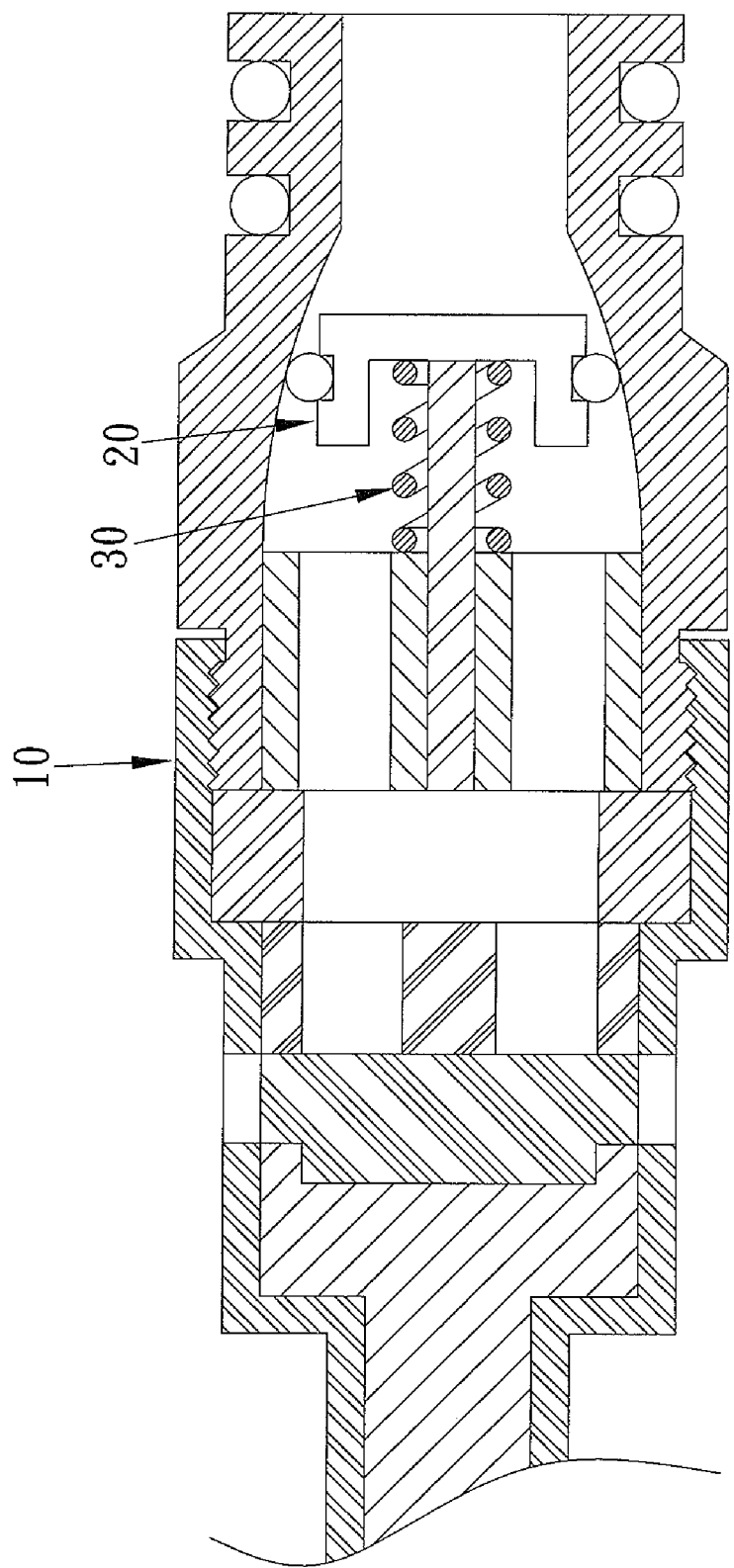
FIG. 8 is a cross sectional view showing the assembly of the conventional watering control valve.
Figure 9:
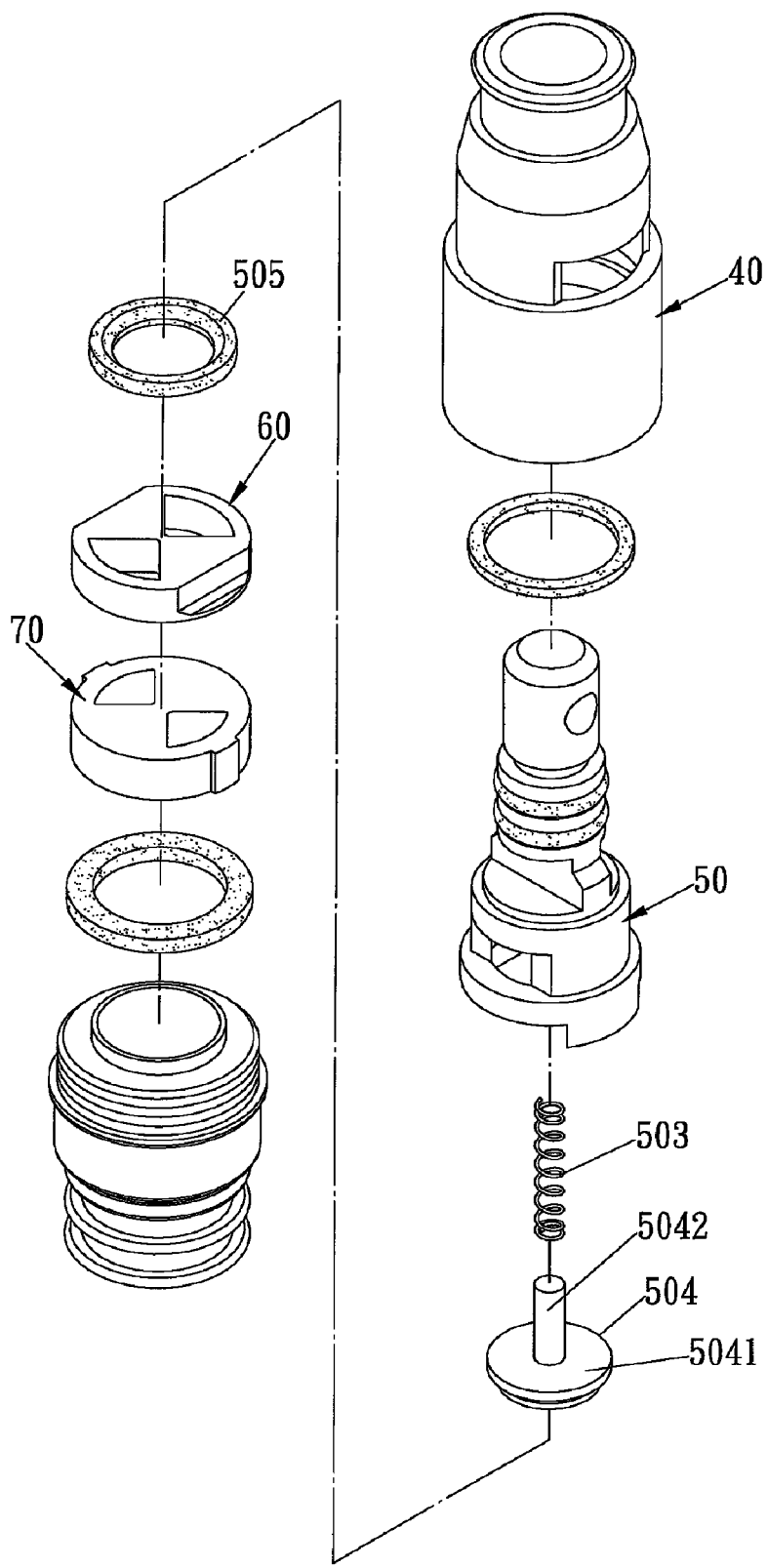
FIG. 9 is a perspective view showing the exploded components of another conventional watering control valve.
Figure 10:
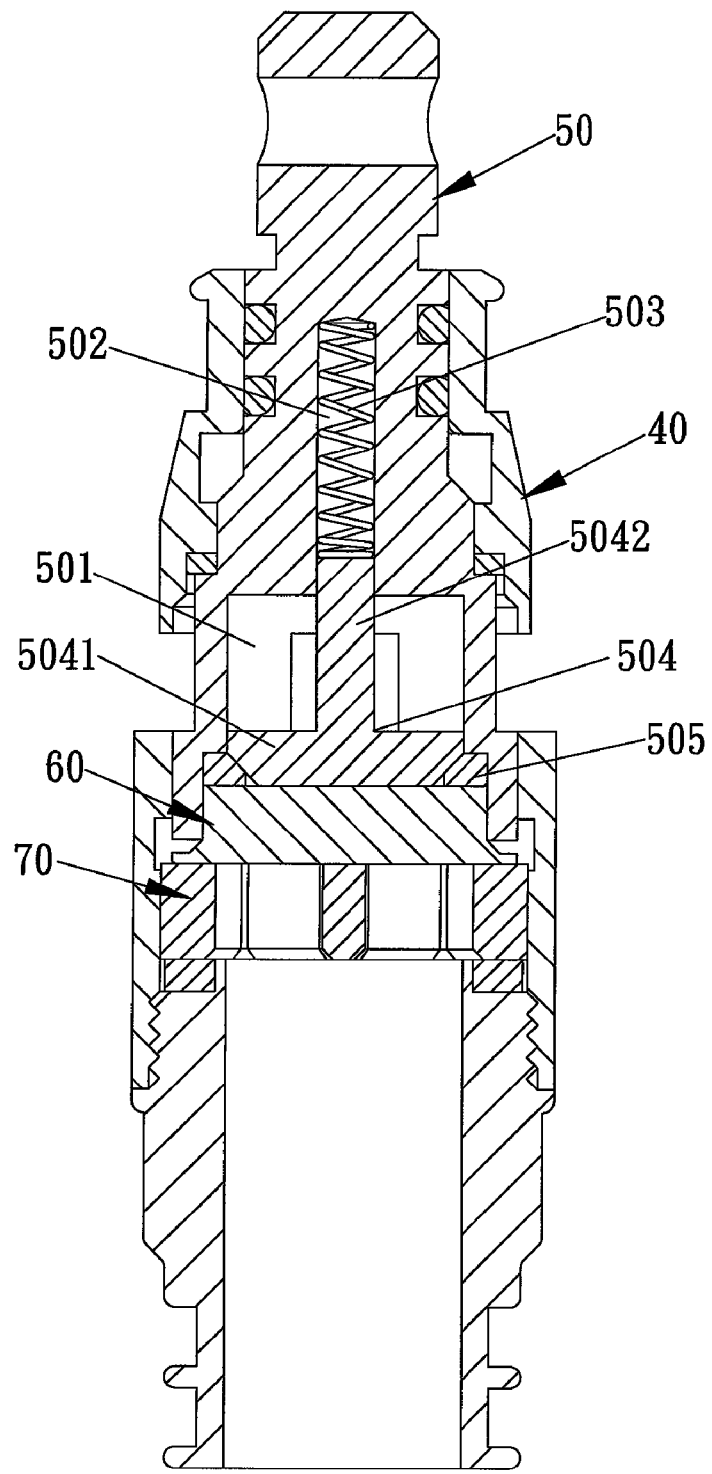
FIG. 10 is a cross sectional view showing the assembly of the conventional watering control valve of FIG. 9.

As shown in FIG. 5, a fitting post 211 of a watering cavity 21 and an annular slot 234 of a check element 23 can be exchanged to be fixed into a control shaft 2 according to a second embodiment of the present invention, wherein a cover 231 of the check element 23 includes a fit pillar 234a disposed on a top surface thereof and around a guiding column 233, and between the fit pillar 234a and a fitting post 211 of a watering cavity 21 is defined with a spring 25 to press the check element 23. As illustrated in FIG. 6, a control shaft 2 according to a third embodiment of the present invention includes a watering cavity 21, and includes a circular trough 211a secured on a top surface thereof and around a positioning groove 22, and between the circular trough 211a and an annular slot 234 of a cover 231 of a check element 23 is defined with a spring 25 to press the check element 23.

Thereby, the unfreeze faucet structure of the present invention has the following advantages:

1. The cover 231 includes the first stop loop 232 fitted to the peripheral side thereof to abut against the trench 242 of the stopping unit 24, and the control shaft 2 includes the second stop loop 28 fitted on the outer periphery thereof below the holes 27 to bias against the inner side of the body 1, the stopping unit 24 includes the third stop loop 243 arranged around the outer rim thereof to engage with the inner wall of the watering cavity 21 of the control shaft 2, thus preventing water from leak as turning off the unfreeze faucet.

2. The check element 23 is biased against by the spring 25 defined between the cover 231 and the watering cavity 21, therefore a diameter of the spring 25 is not limited to obtain a suitable elastic coefficient to push the guiding column 233 to engage with the stopping unit 24 tightly, thus preventing the spring 25 from being locked to lose its elasticity.

While we have shown and described various embodiments in accordance with the present invention, it is clear to those skilled in the art that further embodiments may be made without departing from the scope of the present invention.

What is claimed:

1. An unfreeze faucet structure including a watering control valve comprising a body, a control shaft, an upper ceramic member, and a lower ceramic member which are connected with the body; a valve seat locked to a lower end of the body; wherein the body includes two opposite outlets disposed on a peripheral side of a middle section thereof, the control shaft is inserted to the body and its upper end extends out of the body, the upper ceramic member is received in the body and located at a lower side of the control shaft to engage with the control shaft, and includes two symmetrical bores formed on two sides thereof individually, the lower ceramic member contacts with the upper ceramic member and includes two symmetrical guide apertures disposed on two sides thereof respectively, includes two retaining projections mounted therearound to retain the lower ceramic member in the body, characterized in that:

the control shaft includes a watering cavity and a positioning groove mounted in a lower section thereof, the watering cavity includes a check element and a stopping unit installed therein, and the check element includes a disk-shaped cover arranged on a bottom end thereof, the cover includes a first stop loop fitted to a peripheral side thereof and a guiding column extending upward from a central portion of a top surface thereof to be inserted into the positioning groove, and between the cover and the watering cavity is defined with a spring to abut against the check element downward, the control shaft includes a second stop loop fitted on an outer periphery thereof below two holes of the control shaft to bias against an inner side of the body, the stopping unit includes a trench disposed around an inner wall of a peripheral washer to contact with the first stop loop of the check element, the stopping unit includes a third stop loop arranged around an outer rim thereof to engage with an inner wall of the watering cavity of the control shaft.

2. The unfreeze faucet structure as claimed in claim 1, wherein the watering cavity of the control shaft includes a hollow fitting post fixed on a top surface thereof and extending downward from a peripheral side of the positioning groove, the cover includes an annular slot formed on a top surface thereof and around the guiding column, and between the annular slot and the hollow fitting post of the watering cavity is defined with the spring.

3. The unfreeze faucet structure as claimed in claim 2, wherein the fitting post of the watering cavity and the annular slot of the check element are exchanged to be fixed into the control shaft.

4. The unfreeze faucet structure as claimed in claim 1, wherein the watering cavity of the control shaft includes a hollow fitting post fixed on the top surface thereof and extending downward from a peripheral side of the positioning groove, the cover of the check element includes a fit pillar disposed on the top surface thereof and around the guiding column, and between the fit pillar and the fitting post of the watering cavity is defined with a spring.

5. The unfreeze faucet structure as claimed in claim 1, wherein the watering cavity of the control shaft includes a circular trough secured on the top surface thereof and around the positioning groove, the cover includes an annular slot formed on a top surface thereof and around the guiding column, and between the circular trough and the annular slot is defined with the spring.

* * * * *